Patented Aug. 1, 1933

1,920,208

UNITED STATES PATENT OFFICE 1,920,208

PROCESS FOR THE RECOVERY OF COPPER COMPOUNDS FROM THE WASTE LIQUORS OF THE CUPRAMMONIUM SILK STRETCH SPINNING PROCESS

Ido Mutti, Gozzano, Italy, assignor to The Firm American Bemberg Corporation, New York, N. Y., a Corporation of Delaware No Drawing. Application March 27, 1931, Serial No. 525,862, and in Germany March 28, 1930

17 Claims. (Cl. 23—125)

It is already known in the production of cuprammonium silk to remove the copper from the usually alkaline precipitating liquid by introducing carbohydrates, cellulose or wood meal into the liquid. These substances have the property of absorbing copper from the liquid. After the completion of the absorption the copper precipitated by the substances is completely brought into solution again by means of acid and may then be re-used.

It is also known to recover the copper from the precipitating liquid used in the manufacture of cuprammonium silk by first of all expelling ammonia by suitable expedients and then precipitating out the copper as an insoluble compound, usually as oxide or hydroxide.

These known processes, however, have not led to a satisfactory result in the case of the precipitating liquid used in the production of cuprammonium silk according to the stretch spinning process, since in this process the copper occurs extraordinarily great dilution. The absorptive properties of the substances mentioned in the introduction are no longer sufficient to remove copper from the solution with practical completeness. Similarly, the employment of the second process is out of the question since the vaporization of the ammonia, in view of the small concentration, is not economical enough.

In the precipitating liquid which comes into question copper is contained to the extent of approximately 0.01%, partially in the form of hydroxide and partially in the form of basic sulphate, and it is dissolved in the liquid in a more or less colloidal form. Organic substances, more particularly cellulose degradation products, hereby act as protective colloids.

The present invention has for its object in the first place a recovery of the copper from the highly diluted precipitating liquid which is as complete as possible. The invention further has for its object to employ for this purpose to the maximum possible extent the other waste liquors such as are formed during the preparation of the cotton for the cellulose solution and during the acidification of the final spun filament. Furthermore, according to the invention, the precipitating liquid which has been freed from copper may be neutralized so that it is no longer injurious, for example, for the multiplying of fish. Finally, it is also possible, according to the invention, to use the auxiliary substance employed in a cyclic manner.

The invention consists in this that the copper containing precipitating liquid is first of all treated with an excess of a solution of alkali, usually soda lye. In addition a solution of magnesium salt is added so that magnesium hydroxide is formed by reaction of the excess soda lye with the magnesium salt, which hydroxide carries down copper hydroxide practically completely in the precipitating liquid. In this manner a mud is formed comprised of copper hydroxide and magnesium hydroxide which readily settles on the bottom of the reaction vessel or may be pressed out in filter presses.

It is advantageous to use the bucking lye which is obtained during the preparation of the cotton as the alkaline acting solution. It is true, this lye contains a considerable quantity of cellulose degradation products, but these do not exert any injurious action during the precipitation, since the magnesium hydroxide produced by double decomposition removes the undesirable colloidal properties of these substances.

It is also advantageous if the quantity of magnesium salt added is so adjusted that it just corresponds to the excess of alkaline solution added, so that, e. g., a quantity of magnesium sulphate equivalent to the excess of sodium hydroxide is added. In this manner the liquid freed from the mud contains merely sodium sulphate, which is no longer injurious, so that the liquid may flow away without any further treatment.

The precipitate, which contains, besides organic impurities, substantially only copper hydroxide and magnesium hydroxide, is preferably worked up in such a way that it is treated with acid, particularly sulphuric acid, to such an extent that the magnesium hydroxide dissolves in the form of magnesium sulphate and the copper hydroxide is converted wholly or partially into insoluble basic copper sulphate. For this purpose the copper-containing sulphuric acid which is obtained during the acidification of the filaments, may advantageously be used, the copper sulphate in the said acid being converted during the treatment with the hydroxide-containing mud into insoluble basic copper sulphate.

By means of this reaction, therefore, a mud is obtained consisting mainly of basic copper sulphate and permeated merely with organic impurities, whilst on the other hand a solution of magnesium salt is formed. This solution may be reemployed without any further preliminary for the precipitation of copper from the spent precipitating liquid. The process, therefore, enables the magnesium salt used to be employed in a cyclic manner.

The precipitate obtained in this way, consisting mainly of basic copper sulphate, is then freed from undesirable organic contaminating substances by careful ignition in excess of oxygen at about 400° C., or the said contaminating substances, which comprise degradation products of cellulose, may be removed by cautious washing with cuprammonium solution. The copper mud obtained in this manner may be used for adding to the cellulose solution again either directly or after dissolution in sulphuric acid and precipitation with soda solution in the form of basic copper sulphate.

One modification of the invention is described by way of example in the following:

In 5,000 cubic metres of precipitating liquid there are 500 kg. of copper. To this quantity of precipitating liquid is added soda lye in an amount which corresponds to 1350 kg. of solid caustic soda. In addition 1100 kg. of magnesium sulphate are added in order to neutralize the added excess of caustic soda, about 530 kg. of magnesium hydroxide being formed thereby. In this manner a mixture of copper hydroxide and magnesium hydroxide is formed which contains 788 kg. of copper hydroxide. The mud formed is separated off from the supernatant liquid in a suitable manner, e. g. by filtration. To this mixture is added spinning acid obtained during the acidification of the filaments in such quantity that practically not only all the magnesium hydroxide is converted into magnesium sulphate, but the copper hydroxide of the mud and the copper sulphate contained in the spinning acid are also completely converted into basic copper sulphate.

If it is assumed that the spinning acid contains 1% of copper and 5.25% of free sulphuric acid, then 16.6 cubic metres of spinning acid are necessary for completely carrying out this conversion. If the spinning acid contains more sulphuric acid at the same copper content, then it is necessary to diminish the acid content to a corresponding extent by addition of magnesium carbonate and the like.

The crude basic copper sulphate obtained in this manner is filtered off and cautiously heated at about 400° C. in order to destroy the organic impurities, whilst the magnesium sulphate solution which is also obtained is reemployed for obtaining copper mud from the spent precipitating liquid.

The ignited basic copper sulphate may be dissolved in acid once more for the purpose of further purification, spinning acid, for example, of the same sulphuric acid concentration, being used in a quantity of 14.7 cubic metres for the dissolution. From the solution of copper sulphate so obtained pure basic sulphate may be obtained in the known manner by precipitating with soda in the hot; this basic sulphate may be used again for adding to the cellulose solution.

What I claim is:

1. A process for recovering copper compounds from highly diluted copper containing precipitating liquid obtained in the cuprammonium silk stretch spinning process, which comprises adding to the liquid an alkali and a solution of magnesium salt, the mud containing copper hydroxide and magnesium hydroxide which is formed being separated off from the supernatant liquid.

2. A process as claimed in claim 1, characterized by the feature that the bucking lye obtained during the preparation of the cotton is used as the alkaline acting solution for the precipitation of the copper.

3. A process as claimed in claim 1, characterized by the feature that a quantity of magnesium salt is used for the precipitation which is equivalent to the excess of alkali.

4. A process as claimed in claim 1, characterized by the feature that magnesium sulphate is used for the precipitation.

5. A process as claimed in claim 1, characterized by the feature that the copper-containing mud obtained is treated with a quantity of acid, such that the magnesium hydroxide of the mud dissolves up as magnesium salt, and the copper hydroxide is wholly or partially converted to basic insoluble copper salt.

6. A process as claimed in claim 1, characterized by the feature that the copper-containing sulphuric acid which is obtained during the acidification of the filaments is used for working up the copper-containing mud in such a quantity that the copper sulphate contained therein is also converted by the reaction into insoluble basic copper sulphate.

7. A process as claimed in claim 1, characterized by the feature that the magnesium salt obtained during the conversion of the mud containing copper and magnesium is used in a cycle for the precipitation of the copper from the precipitating liquid.

8. A process as claimed in claim 1, characterized by the feature that the insoluble copper compound remaining behind after the acid treatment of the mud containing copper and magnesium is freed from contaminating cellulose degradation products by washing with cuprammonium solution.

9. A process as claimed in claim 1, characterized by the feature, that the contaminating cellulose degradation products are destroyed by ignition in an excess of air.

10. A process as claimed in claim 1, in which the copper-containing mud is treated with sulphuric acid, whereby the magnesium hydroxide of the mud is dissolved as magnesium salt, and the copper hydroxide is at least in part converted to basic copper sulphate.

11. The process of recovering copper compounds from a dilute solution containing the same, which comprises a step of precipitating magnesium hydroxide in the solution.

12. The process of recovering copper compounds from a dilute solution containing the same, which comprises the steps of precipitating magnesium hydroxide in the solution to carry down copper hydroxide, separating the solution from the mass containing the precipitate, and treating the mass with an acid capable of forming a soluble salt of magnesium and an insoluble salt of copper.

13. The process of recovering copper compounds from a dilute ammoniacal solution containing the same, which comprises the steps of precipitating magnesium hydroxide in the solution, separating the supernatant liquid, and treating the remaining mass with an acid capable of forming a soluble magnesium salt, and an insoluble copper salt.

14. A process for recovering copper from a dilute solution containing the same, which comprises adding an alkaline material and precipitating magnesium hydroxide in the solution, separating out the precipitate, and adding sufficient acid to dissolve the magnesium and produce an insoluble salt of copper.

15. A process for recovering copper compounds from dilute solutions containing the same, which comprises adding an alkali and a solution of a magnesium salt in such quantities as to precipitate magnesium hydroxide in the solution.

16. A process as defined in claim 15 in which the quantity of magnesium salt added is equivalent to the excess of alkali in the solution.

17. A process as defined in claim 12 including separating the insoluble salt of copper and igniting it in an excess of oxygen at a temperature of about 400° C.

IDO MUTTI.